(12) United States Patent
Astbury et al.

(10) Patent No.: US 6,182,074 B1
(45) Date of Patent: Jan. 30, 2001

(54) AUTOMATED GENERATION OF CONTROL INTERFACE TO CONTROLLED ELEMENT OF TELECOMMUNICATIONS NETWORK

(75) Inventors: Michael L. Astbury, Woodbridge; Andrew H. Kerrison, Burstall, both of (GB)

(73) Assignee: British Telecommunications public limited company, London (GB)

( * ) Notice: Under 35 U.S.C. 154(b), the term of this patent shall be extended for 0 days.

(21) Appl. No.: 09/000,101

(22) PCT Filed: Jul. 25, 1996

(86) PCT No.: PCT/GB96/01820

§ 371 Date: Jan. 26, 1998

§ 102(e) Date: Jan. 26, 1998

(87) PCT Pub. No.: WO97/05723

PCT Pub. Date: Feb. 13, 1997

(30) Foreign Application Priority Data

Jul. 25, 1996 (EP) ................................... 95305196

(51) Int. Cl.[7] ...................................................... G06F 17/30
(52) U.S. Cl. ........................... 707/10; 707/101; 707/200; 707/204; 707/205
(58) Field of Search ..................... 340/825.06; 395/50, 395/200.3, 200.38, 200.36, 200.8, 500, 200.18; 707/10, 200, 3, 9, 102, 204, 205; 375/211; 709/206

(56) References Cited

U.S. PATENT DOCUMENTS

| 5,530,852 | * | 6/1996 | Meske, Jr. et al. | 395/200.36 |
| 5,644,686 | * | 7/1997 | Hekmatpour | 395/50 |
| 5,654,985 | * | 8/1997 | Crayford et al. | 375/211 |
| 5,694,595 | * | 12/1997 | Jacobs et al. | 707/9 |
| 5,706,500 | * | 1/1998 | Dzikewich et al. | 707/10 |
| 5,715,397 | * | 2/1998 | Ogawa et al. | 395/200.18 |
| 5,729,730 | * | 3/1998 | Wlaschin et al. | 707/3 |
| 5,734,830 | * | 3/1998 | Balogh et al. | 395/200.38 |
| 5,742,762 | * | 4/1998 | Scholl et al. | 395/200.3 |
| 5,764,955 | * | 6/1998 | Doolan | 395/500 |
| 5,786,770 | * | 7/1998 | Thompson | 340/825.06 |
| 5,793,954 | * | 8/1998 | Baker et al. | 395/200.8 |
| 5,878,420 | * | 3/1999 | De La Salle | 707/10 |
| 6,085,197 | * | 7/2000 | Federighi et al. | 707/102 |

FOREIGN PATENT DOCUMENTS 0 549 504  6/1993 (EP) .
2 206 713  1/1989 (GB) .

* cited by examiner

Primary Examiner—Wayne Amsbury
Assistant Examiner—Thuy Pardo
(74) Attorney, Agent, or Firm—Nixon & Vanderhye P.C.

(57) ABSTRACT

To facilitate the creation of an interface between a network control layer and controlled elements in the network, on insertion of a new element to be controlled an intelligent interface creates a compatibility listing between the network control layer and the element manager, the intelligent interface carries out steps of "look around", "try and see", "follow instructions" and "structured questioning". Each of these steps, in association with a dictionary of "comparable information" results in data being added to a knowledge frame which defines the element and its message format handling requirements.

11 Claims, 8 Drawing Sheets

AUTOMATED GENERATION OF CONTROL INTERFACE TO CONTROLLED ELEMENT OF TELECOMMUNICATIONS NETWORK

BACKGROUND OF THE INVENTION

1. Field of the Invention

The present invention relates to a network interface and more particularly to such an interface for use in translation of coded electrical signals. The invention also relates to methods of constructing such an interface.

2. Related Art

Modern communications networks often comprise a number of layers each of which may include "intelligence". The layers have a hierarchical structure with higher layers making use of functions provided by lower layers to complete assigned tasks. Accordingly an element (or function) in one layer may provide service to an element or function in the layer above and may demand a service from an element or function in the layer below (if any). Thus it is necessary for elements and functions to be able to pass messages between each other. Clearly there has to be some known structure for the messages sent between the layers this structure being known as a message protocol.

Where a complete network is supplied by a single manufacturer, the message protocols are specified by that manufacturer and provided the network does not need to communicate with any other network there is no problem.

However for larger networks, for example for public switched telephony networks (PSTN), it would be unacceptable if the PSTN operator were to be tied to a single manufacturer. Consequently each layer of the PSTN may contain elements from several suppliers, some of which will perform common functions but with a differing message protocol.

Hitherto it has been common practice for the network operator to specify to manufacturers the message protocol to be used by element managers of elements to be incorporated into particular network layers. However, this results in increased costs since each network may require bespoke element manager software to be provided.

An alternative is for the network operator to accept the manufacturers message protocol and to provide bespoke software in the controlling layer. Such arrangements are equally expensive and may lead to inflexibility in the network since it would not be practical to replace an element from one manufacturer with a corresponding element (having a different message protocol) from another manufacturer. The present invention seeks to alleviate the difficulties arising from message protocol incompatibility.

SUMMARY OF THE INVENTION

According to the present invention there is provided a method of constructing an interface between a control layer and a controlled element of the kind having an element manager arranged to control the element in response to messages from the control layer, the method comprising the steps of scanning the element manager to determine the location of data files, opening files so found and examining the respective headers thereof for field names, comparing field names with a predetermined list of field names to identify known types of fields and creating a knowledge file identifying the field locations.

The method may further include the steps of examining each field identified, obtaining numeric information from the fields and incorporating the numeric information in the knowledge file. Preferably the method includes identifying from the knowledge file entries relating to physical elements and transmitting to each such physical element at least one instruction to determine the correct format for the at least one instruction.

An interface created using the above methods may be incorporated in a translation table for use by a network control layer.

A communications network may be provided incorporating an interface created using the above method in particular in the network control layer thereof.

BRIEF DESCRIPTION OF THE DRAWINGS

A communications network of the type having an interface in accordance with the invention and a method of preparing such an interface will now be described by way of example only with reference to the accompanying drawing of which.

DETAILED DESCRIPTION OF EXEMPLARY EMBODIMENTS

Figure 1:
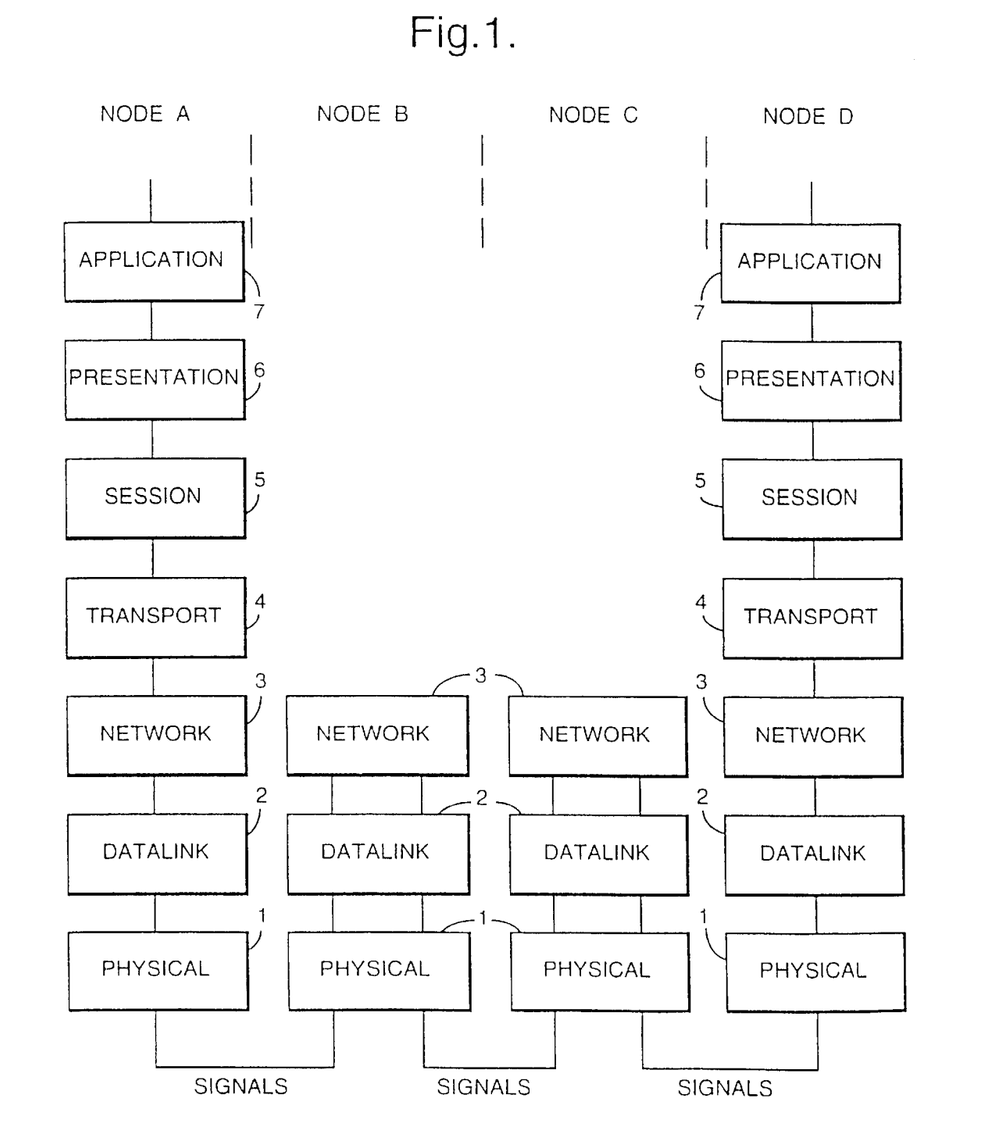
FIG. 1 is a block schematic diagram showing a typical OSI reference model telecommunications network.

Referring first to FIG. 1, the open systems interconnection reference model (OSI) proposed by the International Standards Organisation (ISO) to promote network design compatibility is a seven layer design. Each layer may include sub-layers but fundamental to the proposal is that the terminal of a lower layer is compatible with (communicates with) the connection point of the higher layer and vice versa. Lower layers provide services to higher layers. Accordingly, the OSI digital communications network has a physical layer 1 which is responsible for the actual transfer of data bits to other physical layer 1 entities at other nodes.

The physical layer 1 activity is carried out on behalf of the data link layer 2 which arranges the transmission of data packets between nodes in response to requirements of the network layer 3 which provides for end-to-end transmission of data packets.

Above the network layer 3, transport layer 4 provides end-to-end delivery of messages in response to a session layer 5 which sets up and manages end-to-end communications.

Presentation layer 6 formats and/or compresses data to be transferred while application layer 7 provides complete network services such as file transfer, electronic mail and the like.

The layers 1 to 7 of the OSI model are progressively more intelligent the higher up they are, but ultimately all rely upon the elements which make up the layers below and in particular the parts which effect and control the transfer of digital signals (whether representative of data or speech, video or graphics) in the physical to network layers 1, 2, 3.

In a practical PSTN, layers 1 to 3 of nodes (A, B, C, D) are embedded in concentrators, switches, data processors and other physical communication means such as line cards for connection to lines to customer premises equipment which dictates the destination of each communication.

Figure 2:
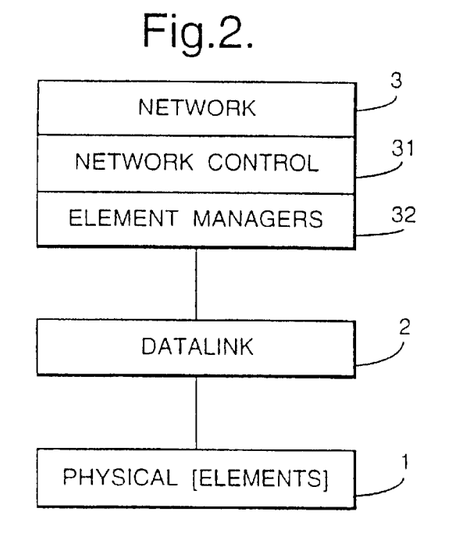
FIG. 2 is a block schematic diagram showing the location of element managers within a telecommunications network.

Now referring to FIG. 2, the physical layer 1 comprises elements such as line cards for connection to customers, multiplexers and other switches. The network layer 3 includes a network control layer 31 which includes element manager software 32 to allow communication between the network control layer 31 and the elements in the physical network. To select a path through the network and to cause an element to behave in a predictable manner the element manager software 32 must cause its respective element to respond in a predictable manner to an instruction from the network control 31.

However, when a new element, say, a line card is provided in the system, unless it is identical to a removed element it must have a bespoke element manager 32 provided.

Figure 3:
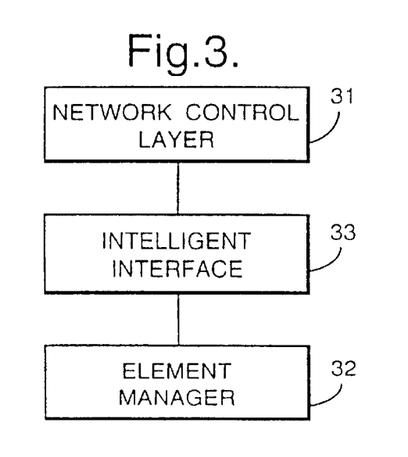
FIG. 3 Shows the location of the interface of the invention with respect to the element manager of FIG. 2.

Referring also to FIG. 3, the present invention provides for an additional software layer, an intelligent interface 33, to be located effectively between the network control layer 31 and each element manager 32. Thus, regardless of the type of element manager 32 provided, the network control layer 31 uses a standard generic message for each task to be performed by the specified element. The interface 33 must therefore provide a translation between the control layer message and the element manager.

While "managers" of "managers" are known, (see for example "Integrated Network Management for Real-Time Operations" by Gary Tjaden and others, IEEE Network Magazine, March 1991, pages 10–15) these comprise translation tables manually prepared for each element manager required. The interface 33 of the present invention carries out this task with a minimum of operator intervention once an element is installed in the physical layer 1 and the corresponding element manager software 32 is provided in the network layer 3.

The intelligent interface 33 is used by the operator to create a knowledge frame in relation to the specified hardware element which has been inserted. Knowledge frames are described by Marvin Minsky in "The Psychology of Computer Vision" edited by P H Winston, published in 1975, chapter 6 headed "A Framework for Representing Knowledge".

In the present case, each type of element which the interface 33 may encounter could have a specified type of knowledge framework. The specific knowledge framework may be selected by the interface as part of its function during the course of scanning as hereinafter described. Alternatively, the installation operator can specify to the software of the intelligent interface 33 the kind of element which has been inserted thus limiting the requirement for software to establish the kind of framework required.

Figure 5:
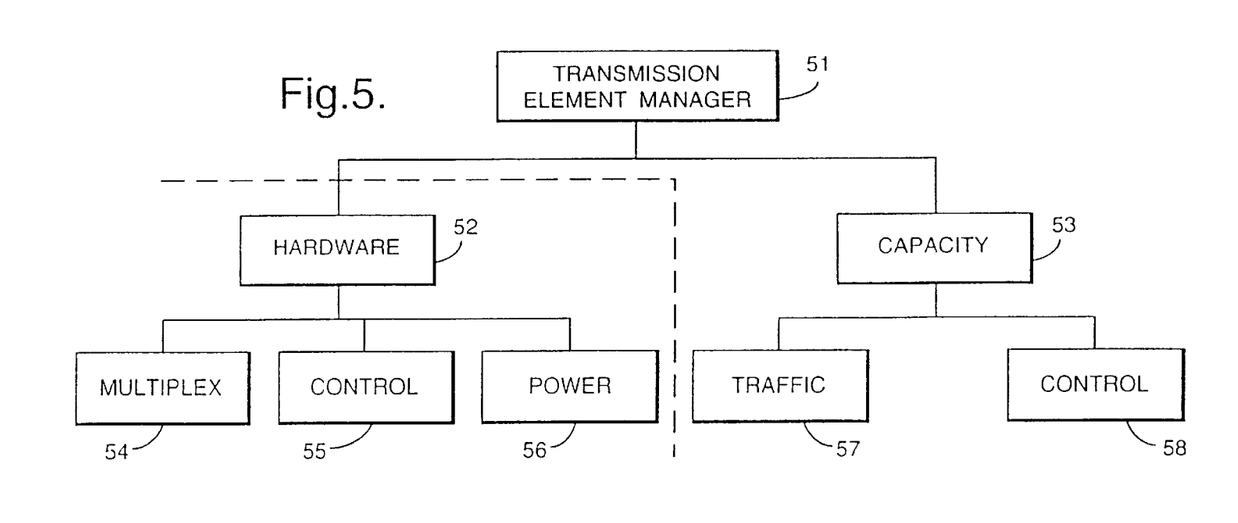
FIG. 5 shows a first part of a knowledge frame used by the interface of the invention.

Referring now to FIG. 5, knowledge frames comprise data which fits particular situations. Each frame is made up of a hierarchy of nodes and relations, the higher level nodes being fixed and containing information which is always true in respect of the element represented by the frame. Lower level nodes have additional slots which are filled with data as more is learnt about the respective element manager.

Consider then a knowledge frame for a transmission element manager. For the software in the network control layer to function effectively allocation of hardware and the capacity of the hardware are required items. Thus, the transmission element manager framework 51 has a hardware data slot 52 and a capacity data slot 53. In hardware 52, for example, the hardware may be broken down into items for use in multiplexing 54, control 55, power 56 where in terms of capacity 53 traffic handling capability 57 or control information 58 are practical propositions.

Figure 6:
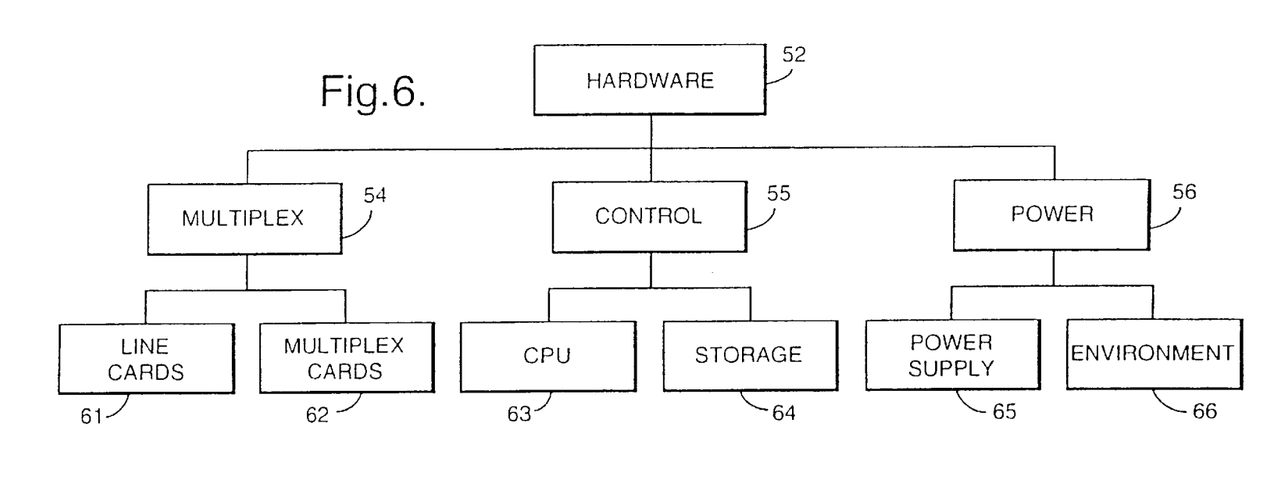
FIGS. 6 and 7 show respective sub-frames of the knowledge frame of FIG. 5.

Referring also to FIG. 6 the hardware frames can be further broken down, for example in multiplexed data the provided element could be line cards 61 or multiplex cards 62, where the control comprises, for example, processing power 63, data storage 64 and the power element 56 has specifically controller power supply data supply 65 and environmental information 66.

Figure 7:
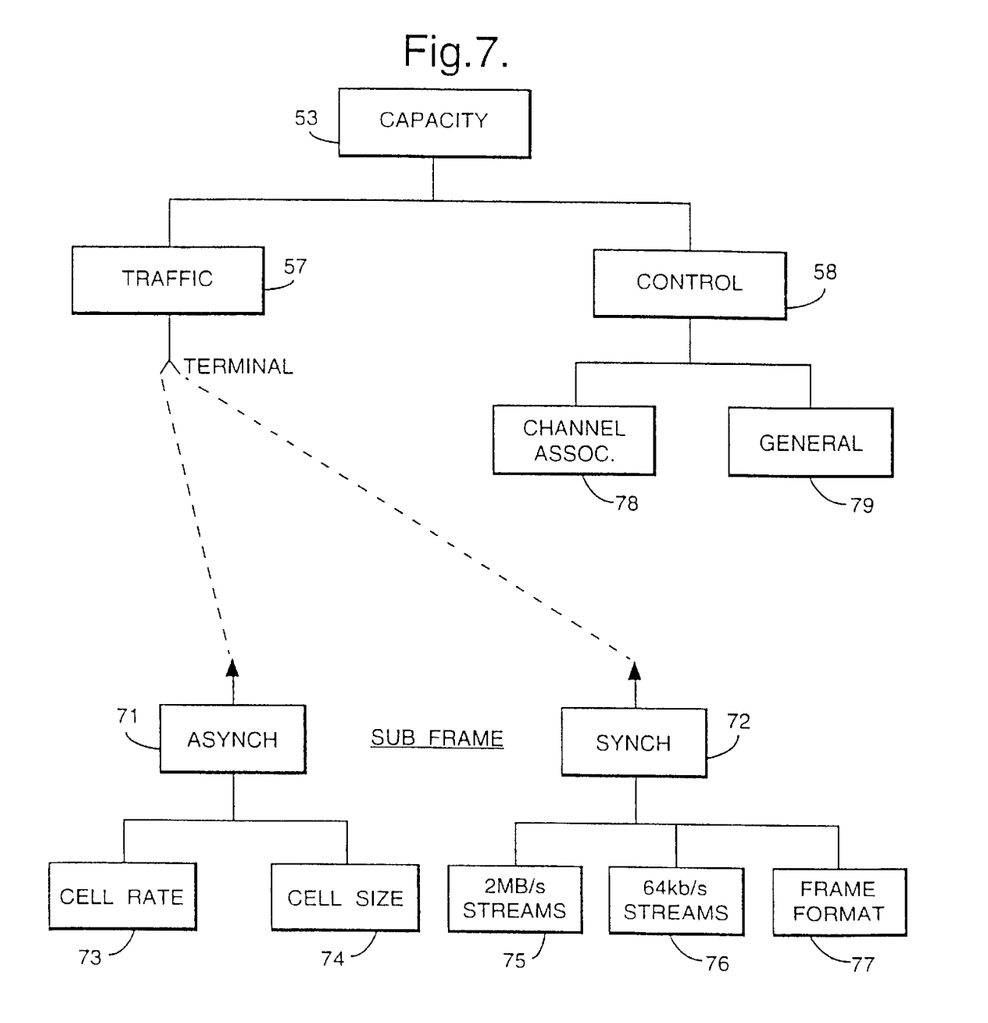

Considering also FIG. 7, the possibility of using sub-frames rather than fixed data must be considered. Thus, for example the traffic element 57 of the capacity knowledge frame 53 may refer out to a sub-frame, for example, for asynchronous data such as an ATM network (asynchronous transfer mode) or for synchronous systems such as a time division multiplexed information. Thus, a sub-frame 71 for asynchronous data may define cell rate 73 and cell size 74 whilst a sub-frame for synchronous data 72 will refer to the number of streams 75, 76 and frame format 77 which the system is adapted to handle. For completeness it is noted that further frame data for control 58 includes channel associated information data 78 and non-channel specific data 79, for example, to control remote hardware.

Referring additionally to FIGS. 8a–d, the manner in which the knowledge frames of FIGS. 5 to 7 are filled by the intelligent interface 33 will now be described. The stages through which the intelligent interface proceeds may be defined as "look around", "try and see", "follow instructions" and "structured questioning". Each of these stages will now be considered in turn.

Figure 8A:
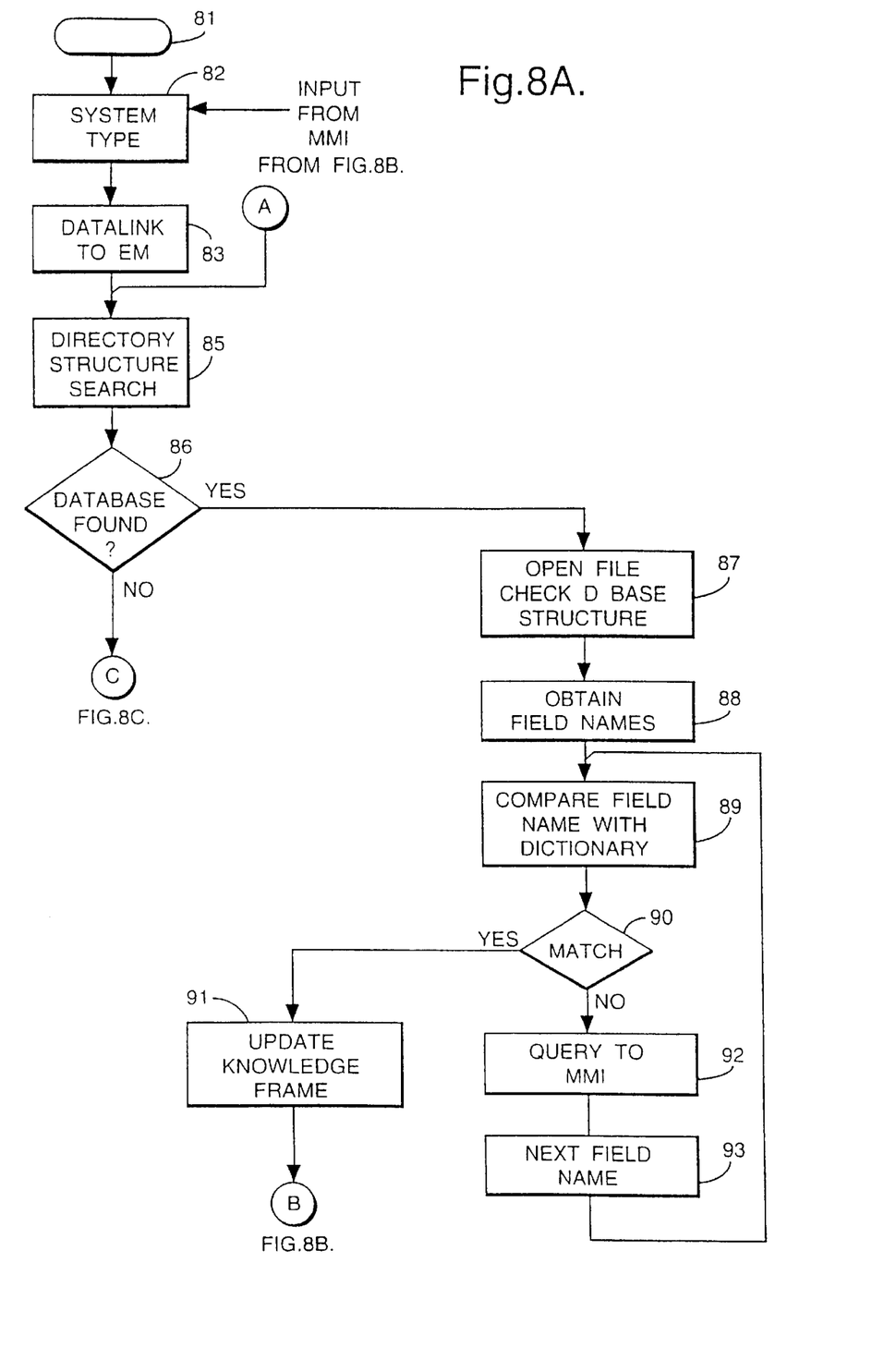
FIGS. 8a to 8d form a flow chart showing the software provided for use in creating the interface of the invention.

Referring to FIG. 8a, on installation of an element and its respective manager, the operator starts the intelligent interface software at 81 and inputs the system type at 82. The interface establishes a link to the element manager at 83 and scans the element manager at 85 looking at lists, database records etc to search for data on commands used by the authors of the element manager. This is shown schematically as a search for directory structure 85 and, assuming that at least one database is found, at 86 the located file is opened at 87 and the header of the file is examined for the database structure. Also from the database structure and header the interface isolates field names within the database at 88 and compares these with known field names in its own dictionary at 89. If a known field type is located then that field type and its location is stored in the knowledge frame at 91 and further investigation of the database continues in FIG. 8b. However, if at 89 an apparent field name does not coincide with a known field name from the internal dictionary, then a query is stored for subsequent output to the man machine interface at 92 and further fields within the same database are checked.

Assuming that one or more correct field names are isolated and the knowledge frame updated with the location of those fields at 91. Then, turning now to FIG. 8b, the look around stage continues with the interface causing the database to open at 94 to examine fields for entries. Each entry located at 95 is compared with an appropriate sub-dictionary for valid field entries to determine whether a match occurs 96. Again if there is no match a query is raised for the man machine interface at 98 and further fields are examined 99.

Figure 8B:
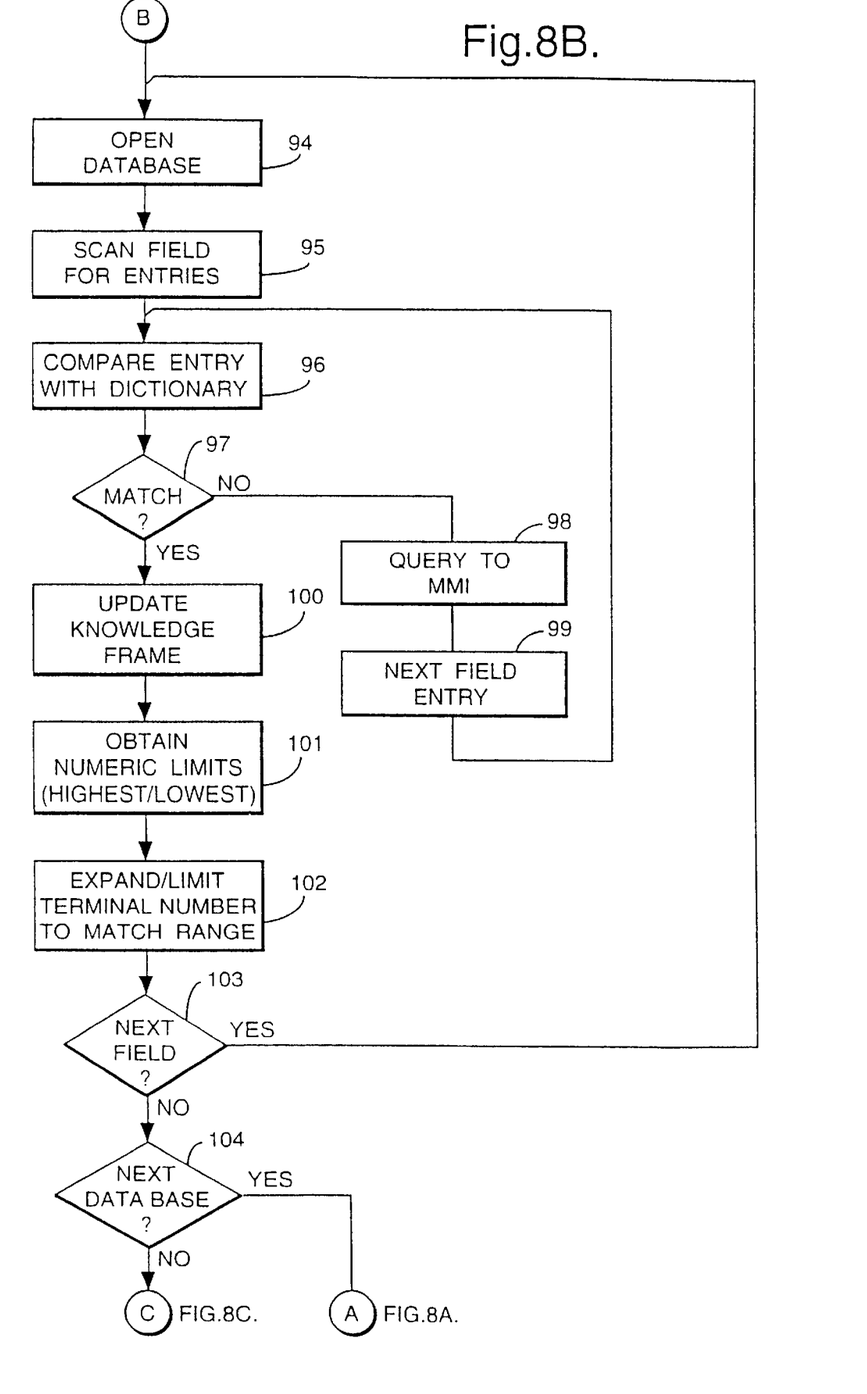

Again if at 97 a match is determined between a current field entry and the sub-dictionary then the knowledge frame is updated with the relevant information at 100. Using the numeric limits "highest" "lowest" attained from the field entries the knowledge frame is updated with the terminal range noted at 102. If there are further fields to examine within the database then the procedure continues until all of the fields of an identified database have been checked using the procedure of steps 94 to 102. Assuming that all of the fields of a particular database have been checked then the procedure recommences at step 84 of FIG. 8*a* for any other databases found.

Figure 8C:
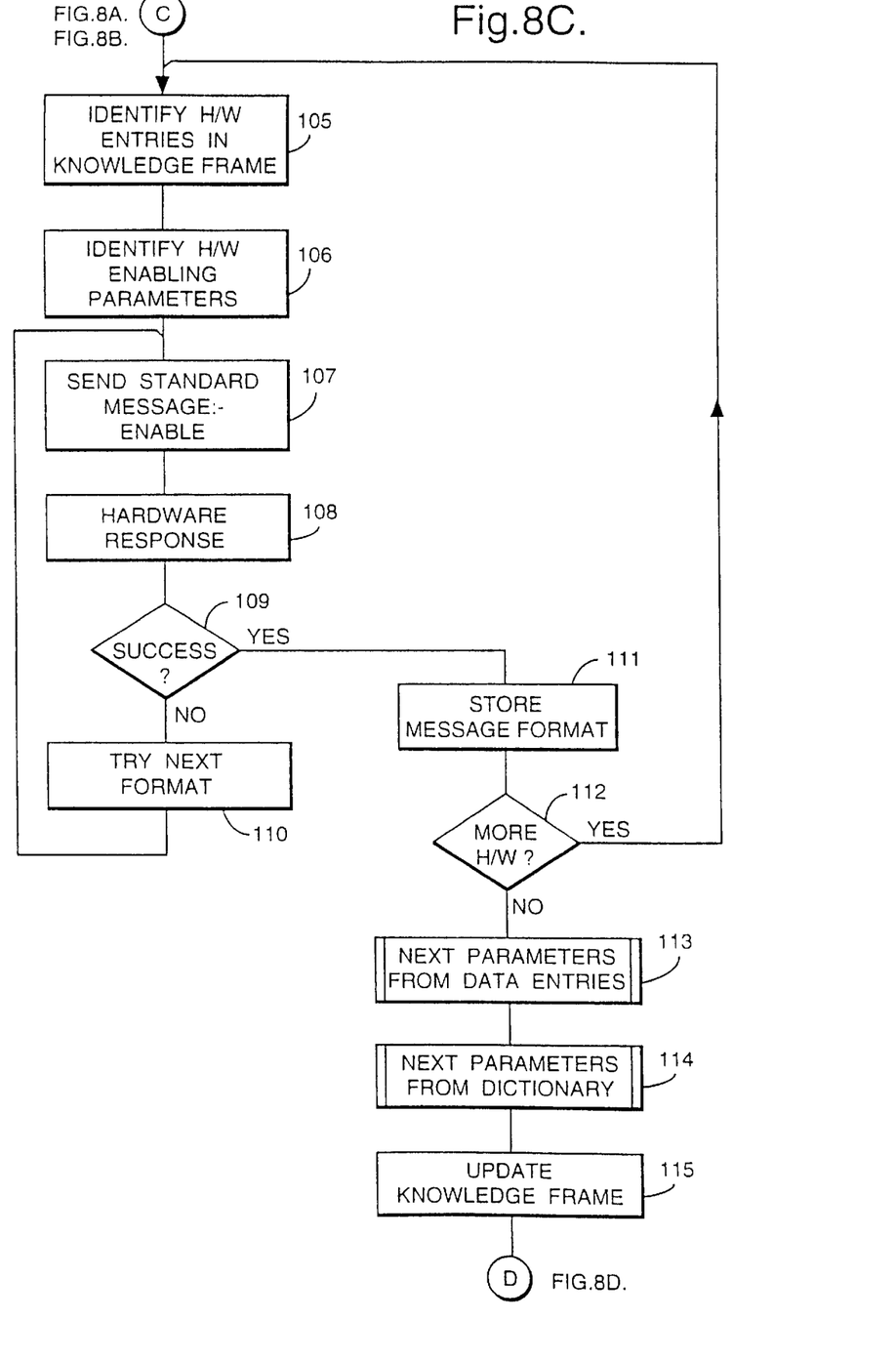

Once all of the databases apparently present in the element manager have been identified and field entries checked then the software interface proceeds to the next stage at FIG. 8*c*.

In the try and see stage, the interface 33 identifies from the knowledge gathered in the knowledge frame of FIG. 5 and FIG. 6 the entries which define hardware 105, for example, a line card. From the dictionary, having identified the hardware, certain parameters such as on/off or other recognisable physical actions related to the hardware are identified at 106. Using commands that the element manager might expect from a network control sequence, for example a standard enable message 107, the interface 33 forwards a signal to try and effect one of these actions. The hardware will respond in some way, either with an acknowledge message indicating that the function has been carried out, with another message indicating a failure, for example message not understood, or with a message perhaps indicating that the parameters are out of range.

If the hardware response indicates that the message has been successful then the message format is stored at 111 and the same function is carried out for other hardware entries held in the knowledge frame in respect of the particular element manager.

Should no response or a fail response be received from the hardware, then a further different format will be tried at 110 until such time as a success is received.

Having completed steps 105 to 111 for each piece of identified hardware, the interface 33 checks for further operational parameters within the data entries at 113 and repeats steps 105 to 12 in respect of those parameters. At step 114, the steps of 105 to 112 may be repeated for parameters which are stored in the dictionary area of the interface 33 rather than being stored in the data entries of the element manager.

Having ascertained the format for commands using try and see the interface 33 updates the knowledge frame in respect of the particular element manager at 115 and proceeds to a follow instructions stage. This stage shown in FIG. 8*d* comprises searching the element manager database for a "new command" file. If such a file is located, then each of these commands is tried in turn and the knowledge frame updated accordingly. Thus, if the element manager author indicates through a standard language such as ASN1 that additional functionality has been provided in the element, then testing of the functionality and updating of the knowledge frame occurs at steps 116 to 119.

Figure 8D:
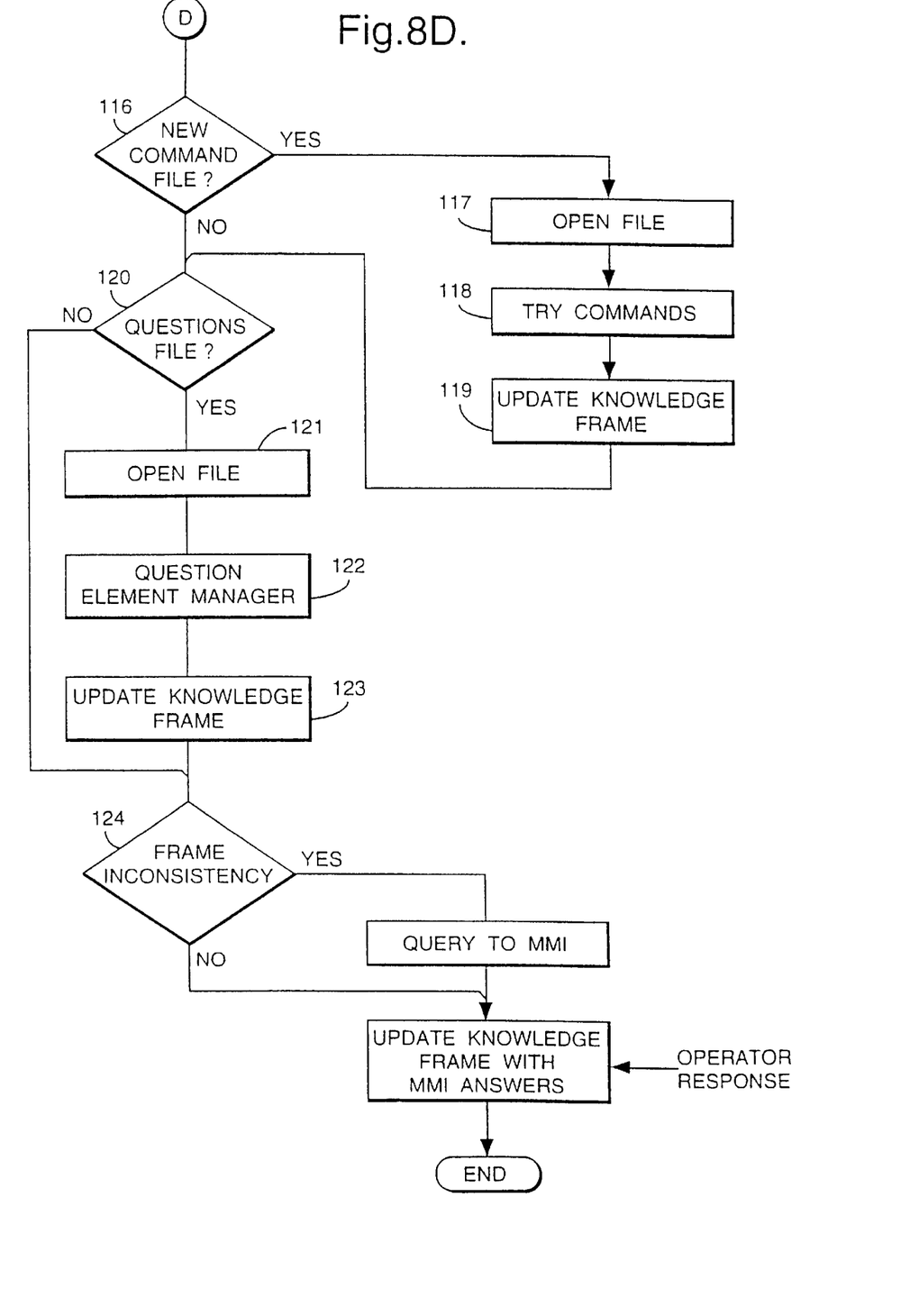

Then, in the structured questioning section, the interface opens its own questions file which contains specific pre-specified commands or queries to which the author of the element manager software will have been expected to provide standard answers. The answers to these questions will provide further information to enable updating of the knowledge frame at step 121 to 123.

Finally, at step 124, the interface 33 checks for any absence of data within the knowledge frame or for any conflict between data held therein. Any inconsistency may be passed to the man machine interface at step 125 along with other queries which have been raised in previous stages of the installation.

Operator responses to queries on the man-machine interface complete the task of creating an appropriate translation between the network control layer message structure and the element manager structure.

Whilst the interface software is shown as being in permanent communication between the network control layer 31 and the element manager 32 (in FIG. 3) it will be appreciated that effectively the intelligent interface 33 automatically creates a translation table between messages output as standard by the network control system of the PSTN operator and the element manager software provided by the manufacturer.

Figure 4:
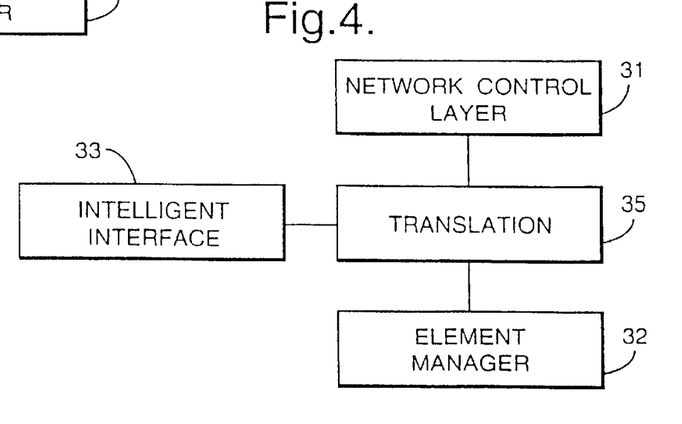
FIG. 4 shows an alternative implementation to that of FIG. 3.

Using the various responses from the element manager, such as "I do not understand" where a message does not make sense or "I cannot do that" responses where an acceptable message has been received but the appropriate equipment is not present a translation table can be built. In most cases, as shown in FIG. 4, the interface 33 may simply create a translation table 35 which sits between the network control layer 31 and the element manager 32 to provide the functionality required.

What is claimed is:

1. A method of constructing an interface between a control layer and a controlled element of the kind having an element manager arranged to control the element in response to messages from the control layer, the method comprising the steps of:

scanning the element manager to determine the location of data files, opening files so found and examining the respective headers thereof for field names, comparing said field names with a predetermined list of field names to identify known types of fields, creating a knowledge file identifying the field locations, and creating said interface between a control layer and a controlled element using the knowledge file.

2. The method of claim 1 further including the steps of:

examining each field identified, obtaining numeric information from the fields, and incorporating the numeric information in the knowledge file.

3. An interface created by the method as in claim 1 and incorporated in a translation table used by the network controller.

4. A telecommunications network comprising:

a physical communications layer and a network control layer, the physical communications layer comprising:
 a multiplicity of elements, each element having a respective element manager,
 the respective element managers being arranged to control respective elements in response to messages from the network control layer, and
 the control layer including an interface created by the method as in claim 1.

5. A telecommunications network comprising:

a physical communications layer and a network control layer, the physical communications layer comprising:
 a multiplicity of elements, each element having a respective element manager, the respective element managers being arranged to control respective elements in response to messages from the network control layer, and the control layer including an interface as in claim 3.

6. A method of constructing an interface between a control layer and a controlled element of the kind having an element manager arranged to control the element in response to messages from the control layer, the method comprising the steps of:

scanning the element manager to determine the location of data files;

opening files so found and examining the respective headers thereof for field names;

comparing field names with a predetermined list of field names of identify known types of field;

creating a knowledge file identifying the field locations;

examining each field identified;

obtaining numeric information from the fields and incorporating the numeric information in the knowledge file;

identifying from the knowledge file entries relating to physical elements; and transmitting to each such physical element at least one instruction to determine the correct format for the at least one instruction.

7. A method of constructing an interface between a control layer and a controlled element of the kind having an element manager arranged to control the element in response to messages from the control layer, the method comprising the steps of:

scanning the element manager to determine the location of data files, opening files so found and examining the respective headers thereof for field names, comparing said field names with a predetermined list of field names to identify known types of fields, creating a knowledge file identifying the field locations, identifying, from the knowledge file, entries relating to physical elements, and transmitting to each such physical element at least one instruction to determine the correct format for the at least one instruction.

8. A method of constructing an interface between a control layer and a controlled physical element each physical element having a respective element manager arranged to control the element in response to messages from the control layer, the method comprising the steps of:

scanning the element manager to determine the location of data files, opening files so found and examining the respective headers thereof for field names, comparing said field names with a predetermined list of field names to identify known types of fields and creating a knowledge file identifying the field locations, examining each identified field and obtaining information from the fields which information is added to said knowledge file, identifying, from the knowledge file, entries relating to said physical elements, and transmitting to each such physical element at least one instruction to determine the correct formal for the at least one instruction.

9. The method of claim 8 further including:

transmitting to each said physical element one instruction in a first format and monitoring the response from said physical element, for each valid response received from a physical element adding format information in the knowledge file and, for each invalid response, formatting said instruction in a different manner and repeating transmission to the physical element.

10. An interface between a network controller and a control element in a telecommunications network, said interface being created using the method of claim 8.

11. A telecommunications network comprising:

a physical communications layer and a network control layer, the physical communications layer comprising a multiplicity of physical elements each having a respective element manager, the respective element managers being arranged to control respective physical elements in response to messages from the network control layer, the control layer including at least one interface created from a knowledge file derived from a respective element manager by determining the location of data files in the element manager, opening the files and identifying field names, comparing field names with a predetermined list of field names to identify known types of field, obtaining information from the identified fields and adding such information to the knowledge file, and transmitting at least one instruction to a respective physical element to determine the correct format for said physical element.

* * * * *

UNITED STATES PATENT AND TRADEMARK OFFICE
CERTIFICATE OF CORRECTION

PATENT NO.    : 6,182,074 B1
DATED         : January 30, 2001
INVENTOR(S)   : Astbury et al.

It is certified that error appears in the above-identified patent and that said Letters Patent is hereby corrected as shown below:

<u>Title page,</u>
Insert the following item:
-- [30]  Foreign Application Priority Data
Jul. 25, 1995    (EP)............................95305196 --.

Signed and Sealed this

Ninth Day of March, 2004

JON W. DUDAS
*Acting Director of the United States Patent and Trademark Office*